J. M. BRANDVEIN.
EDUCATIONAL TOY.
APPLICATION FILED APR. 29, 1921.
1,414,857.
Patented May 2, 1922.
2 SHEETS—SHEET 1.
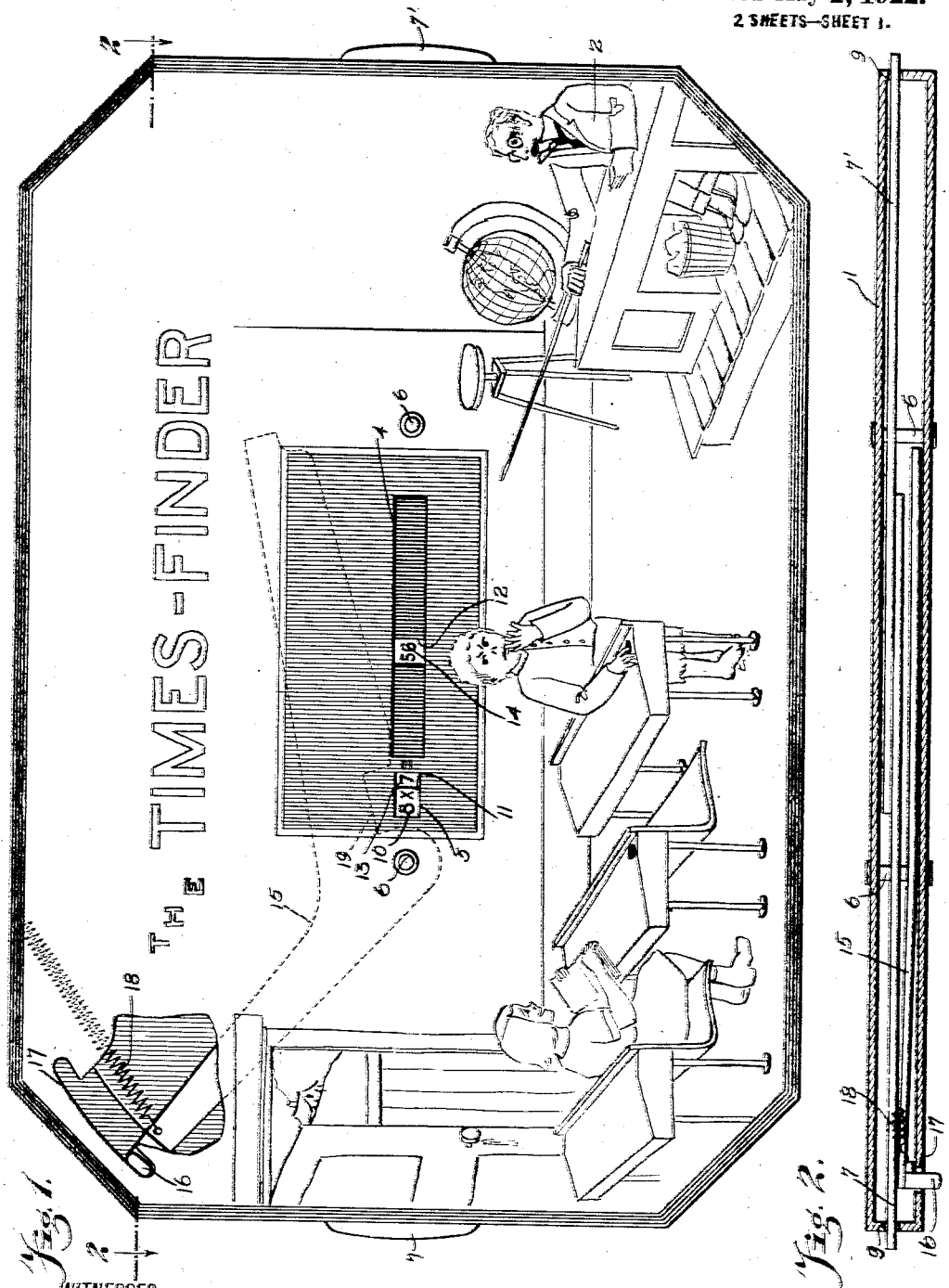
WITNESSES
INVENTOR
J. M. BRANDVEIN
BY Munn & Co
ATTORNEYS J. M. BRANDVEIN.
EDUCATIONAL TOY.
APPLICATION FILED APR. 29, 1921.
1,414,857.
Patented May 2, 1922.
2 SHEETS—SHEET 2.
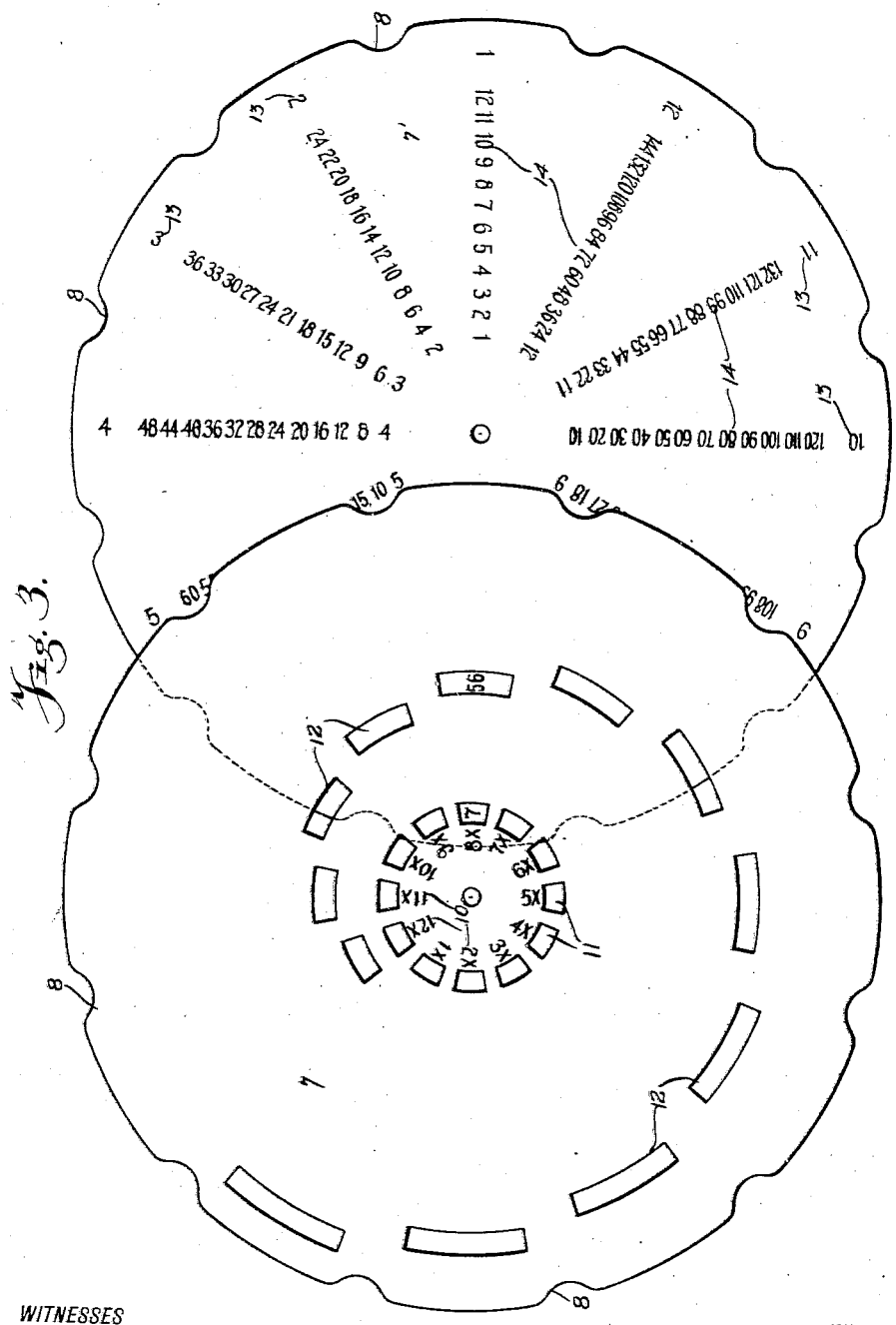
WITNESSES
INVENTOR
J. M. BRANDVEIN
ATTORNEYS

UNITED STATES PATENT OFFICE.

JACOB M. BRANDVEIN, OF NEW YORK, N. Y.

EDUCATIONAL TOY.

1,414,857.   Specification of Letters Patent.   Patented May 2, 1922.

Application filed April 29, 1921. Serial No. 465,476.

*To all whom it may concern:*

Be it known that I, JACOB M. BRANDVEIN, a citizen of the United States, and a resident of the city of New York, borough of Bronx, in the county of Bronx and State of New York, have invented a new and Improved Educational Toy, of which the following is a full, clear, and exact description.

This invention relates to improvements in educational toys, the primary object of the invention being to provide a toy calculator, which will aid in teaching children the multiplication tables.

One disadvantage of most of the patented toys of this character is the fact that more than one problem is visible at a time, so that a child sees a multiplicity of problems and answers displayed simultaneously and is therefore unable to concentrate his or her mind upon any one of them. A further object of this invention, therefore, is to provide a toy of the character set forth wherein only one problem is exposed at a time and the answer to that problem is normally concealed, and to provide improved means for exposing the answer to the problem after the child has mentally solved or attempted to solve the problem.

Another object is to provide a toy which will be simple and practical in construction, neat and attractive in appearance, strong and durable in use, and comparatively inexpensive to manufacture.

With these and other objects in view, the invention consists in certain novel features of construction and combinations and arrangements of parts, as will be more fully hereinafter described and pointed out in the claims.

In the accompanying drawings:—

Figure 1 is a view in front elevation of my improved toy;

Figure 2 is a view in section therethrough on the line 2—2 of Figure 1; and

Figure 3 is a plan view illustrating the relative position of the discs 7 and 7'.

Referring in detail to the drawings, 1 represents a relatively flat and substantially rectangular casing. Upon the front face of the casing, there is displayed any preferred design indicated generally by the reference numeral 2. Although I do not wish to limit myself to any particular design, it might be noted that a design which includes a centrally disposed representation of a blackboard in a school room scene and a representation of a teacher pointing toward the blackboard will tend to draw attention immediately toward the blackboard. In the representation of the blackboard, there is provided a relatively long horizontal slot 4 and adjacent thereto, a short slot 5. The problem is exposed through the slot 5 and the answer appears through the longer slot 4.

On each side of the representation of the blackboard, an arbor 6 is provided extending transversely across the casing and discs 7 and 7' are mounted on the arbors. The peripheries of the discs are formed with thumb receiving recesses such as 8. The outer edges of the discs extend through slots 9 in opposite ends of the casing and the inner edges of the discs overlap, the disc 7 being located in front of the disc 7'.

The disc 7 has displayed thereon around its center, an annular series of numerals such as 10, ranging preferably from 1 to 12 and arranged in regular sequence. Besides each numeral a conventional times sign in the form of an "X" is displayed. Adjacent each times sign and between the said sign and the periphery of the disc are openings 11, so that an annular series of such openings are provided outside of the ring of numerals 10.

The disc 7 is also provided with a spiral series of arcuate openings or slots such as 12, each opening 12 being located in the radial line of one of the openings 11, the openings 12 being located at predetermined varying distances from the openings 11 with which they are aligned. That opening 12, which is in alignment with the highest numeral 10 is located nearest the center of the disc 7 and that opening 12 which is aligned with the lowest numeral 10 is located furthest from the disc 7. Any one of the numerals 10 with its times sign may be exposed through the opening 5 in the casing by rotating the disc 7 and the corresponding opening 11 will register with the opening 5 and expose a numeral on the edge of the disc 7'.

The numerals 10 represent the multipliers in a problem. The numerals on the disc 7' exposed through the openings 11 represent the multiplicands. When one of the openings 11 is in registry with the opening 5, then the corresponding opening 12 will be in registry with the slot 4 and will expose a numeral on the disc 7', which represents the product of the multiplier and multiplicand visible through the slot 5.

Around the outer edge of the disc 7' is displayed an annular series of numerals 13 corresponding to the numerals 10. These numerals are selectively displayed through the opening 5 and one of the openings 11 and as before noted, represent the multiplicand in a problem of multiplication. Radial series of numerals such as 14 located along the same radial axes as the numerals 13 are displayed on the disc 7'. This radial series of numerals contains the multiples of the numerals 13 with which they are aligned, the least multiples being displayed in an annular series adjacent the center of the disc 7' and adapted to register with the innermost opening 12 and the greatest multiples being located in an annular series furthest removed from the center of the disc 7' and adapted to selectively register with the outer-most opening 12.

These numerals represent as above noted, the products of the multipliers 10 and the multiplicands 13, so that when one of the multipliers is exposed in the slot 5, and any desired multiplicand through the slot 5 and one of the openings 11, then the product will be exposed through the slot 4 and one of the openings 12.

Pivoted within the casing on one of the arbors 6, is an angular lever 15 which includes at one end an offset handle member 16 movable through a slot 17 adjacent the corner of the casing. A spring 18 normally retains the other end of the lever which is in the form of a shutter in position behind the slot 4 to conceal the answer to the problem exposed through the slot 5. This end of the lever includes a recess such as 19, at all times registering with the slot 5, so that the multiplier and multiplicand are constantly exposed.

It will be readily seen that by turning the discs any problem of multiplication may be set up in the slot 5 and that after the child has mentally calculated the results, the handle 16 is actuated to move the shutter to one side and expose the correct answer through the slot 4.

Although I have illustrated one of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. A toy of the character described, including a casing, having a pair of openings therein, discs mounted to rotate in the casing and having numerals and arithmetical signs thereon adapted to register with the openings upon rotation of the discs, means whereby rotation of the discs to expose the problem in one opening automatically moves the numeral representing the answer to the problem into registration with the other opening, and a spring held shutter normally concealing said answer.

2. A toy of the character described including a casing, having a pair of openings therein, discs in the casing having numerals displayed thereon adapted to be selectively exposed through the openings upon rotation of the discs, said numerals and openings so arranged that when one of said discs is moved to expose a numeral representing a multiplier through one opening and the other disc is moved to expose a numeral representing a multiplicand through the same opening, the product of said multiplier and multiplicand will be exposed through the other opening.

3. A toy of the character described including a casing, having a pair of openings therein, discs in the casing having numerals displayed thereon adapted to be selectively exposed through the openings upon rotation of the discs, said numerals and openings so arranged that when one of said discs is moved to expose a numeral representing a multiplier through one opening and the other disc is moved to expose a numeral representing a multiplicand through the same opening, the product of said multiplier and multiplicand will be exposed through the other opening, and a spring held shutter normally located between said last mentioned openings and the disc to conceal the numeral representing the product.

4. A device of the character described including a relatively flat casing having a pair of openings in one face thereof, arbors journaled in the casing, discs mounted on the arbors and having numerals thereon adapted to be exposed through said openings and a spring held shutter normally interposed between one of the openings and the discs, said shutter including an integral extension, an offset handle member on said extension, said casing having a slot therein in which said handle member is movable.

JACOB M. BRANDVEIN.